United States Patent
Hamano et al.

[11] Patent Number: 5,981,107
[45] Date of Patent: Nov. 9, 1999

[54] LITHIUM ION SECONDARY BATTERY AND METHOD OF FABRICATING THEREOF

[75] Inventors: Kouji Hamano; Hisashi Shiota; Shou Shiraga; Shigeru Aihara; Yasuhiro Yoshida; Michio Murai; Takayuki Inuzuka, all of Tokyo, Japan

[73] Assignee: Mitsubishi Denki Kabushiki Kaisha, Tokyo, Japan

[21] Appl. No.: 08/990,764

[22] Filed: Dec. 15, 1997

[30] Foreign Application Priority Data

Dec. 17, 1996 [JP] Japan ................................ 8-337099

[51] Int. Cl.⁶ ..................................................... H01M 2/18
[52] U.S. Cl. .................... 429/231.95; 429/129; 429/143; 429/145; 429/147; 429/241; 429/242; 429/243
[58] Field of Search ..................... 429/129, 143, 429/145, 146, 147, 241, 242, 243, 244, 231.95; 29/623.3, 623.4, 623.5, 223.5

[56] References Cited

U.S. PATENT DOCUMENTS 5,437,692 8/1995 Dasgupta et al. .
5,456,000 10/1995 Gozdz et al. .
5,498,489 3/1996 Dasgupta et al. .

*Primary Examiner*—Maria Nuzzolillo
*Assistant Examiner*—Angela J. Martin
*Attorney, Agent, or Firm*—Oblon, Spivak, McClelland, Maier & Neustadt, P.C.

[57] ABSTRACT

To obtain a lithium ion secondary battery having excellent charge and discharge characteristics in which electric connection between active material layers and a separator can be maintained without requiring a strong armor metal case, so that it can be made into thin forms having large energy density. Convex parts and concave parts are formed on at least two surfaces among surfaces of a positive electrode active material layer 7 and a negative electrode active material layer 9 both adjacent to a separator 4 and surfaces of the separator 4 facing both of the active material layers 7, 9, and these three means are bonded and closely adhered by an adhesive resin layer 11 and electrically connected by keeping a lithium ion-containing electrolytic solution in the separator 4 and voids 12 formed by a bonded surface 11a of the convex parts and the concave parts.

20 Claims, 8 Drawing Sheets

LITHIUM ION SECONDARY BATTERY AND METHOD OF FABRICATING THEREOF

BACKGROUND OF THE INVENTION

1. Field of the Invention

This invention relates to a lithium ion secondary battery in which a separator which keeps electrolytes is sandwiched between facing positive and negative electrodes, more particularly to a battery structure in which electric connection between positive and negative electrodes and separator is improved so that it can be made into thin form and the like optional forms without requiring a strong armor metal case and to a production method for the formation of said structure.

2. Description of the Related Art

There is a growing demand for the miniaturization and lightening of portable electronic instruments, and it is essential to improve performance of batteries to meet such a demand. Because of this, development and improvement of various batteries have been attempted in recent years with the aim of improving the battery performance. Expected characteristics of batteries to be improved include high voltage, high energy density, tolerance for high load resistance, optional shaping, safety and the like. Particularly, lithium ion battery is a secondary battery which can realize the highest voltage, highest energy density and tolerance for highest load resistance among existing batteries, and its improvement is still being made actively.

As its main composing elements, the lithium ion secondary battery has a positive electrode, a negative electrode and an ion conducting layer inserted between these electrodes. In the lithium ion secondary batteries which have been put into practical use, a plate-shaped material prepared by mixing powder of a lithium-cobalt oxide or the like active material with powder of an electron conducting substance and a binder resin and coating the mixture on an aluminum collector is used as the positive electrode, and another plate-shaped material prepared by mixing powder of a carbonaceous active material with a binder resin and coating the mixture on a copper collector is used as the negative electrode. Also, a porous film such as of polyethylene, polypropylene or the like filled with a lithium ion-containing non-aqueous solution is used as the ion conducting layer.

For example, FIG. 11 is a sectional view showing the structure of a prior art cylindrical lithium ion secondary battery disclosed in JP-A-8-83608 (the term "JP-A" as used herein means an "unexamined published Japanese patent application"). In FIG. 11, 1 is an armor case made of stainless steel or the like which also serves as a negative electrode terminal, 2 is an electrode body contained in the armor case 1, and the electrode body 2 has a structure in which a positive electrode 3, a separator 4 and a negative electrode 5 are coiled in a spiral shape. In order to maintain electric connection among respective surfaces of the positive electrode 3, separator 4 and negative electrode 5, it is necessary to apply external pressure to the electrode body 2. Because of this, the aforementioned contact among respective surfaces is maintained by pressurizing the electrode body 2 inserted into the strong armor case 1. In the case of a square battery, strips of electrode body are tied up into a bundle and put into a square metal case, thereby pressing them with external force.

As described in the foregoing, in the currently available lithium ion secondary batteries, strong armor cases made of metals and the like are used as a means to closely adhere positive and negative electrodes. Without the armor case, surfaces of the electrode body 2 are peeled off, so that the electric connection becomes difficult to maintain and the battery characteristics are deteriorated. On the other hand, not only the energy density of the battery itself is reduced, because the weight and volume of the armor case occupying the entire portion of the battery are large, but also shapes of the battery are limited due to rigidity of the armor case itself, thus causing a difficulty in making optional shapes.

In view of such backgrounds, development of a lithium ion secondary battery which does not require a strong armor case has been attempted with the aim of achieving lightening and thinning the battery. The point of the development of such a armor case-free battery is how to maintain electric connection of a positive electrode, a negative electrode and an ion conducting layer (separator) which is sandwiched by them, without applying external force. As such a connecting means which does not require external force, a method has been proposed in which the positive electrode and negative electrode are closely adhered to the separator making use of a resin or the like.

For example, JP-A-5-159802 discloses a production method in which an ion conductive solid electrolyte layer and positive and negative electrodes are integrated into one body by their heat treatment using a thermoplastic resin binder. In this case, the electrodes are closely adhered to each other by integrating the positive and negative electrodes and the solid electrolyte layer into one body, so that electric connection among the positive and negative electrodes and the solid electrolyte layer is maintained and the integrated body functions as a battery without applying external force.

Since the prior art lithium ion secondary batteries are constructed in the aforementioned manners, a battery which uses a strong armor case to ensure adhesiveness and electric connection between positive and negative electrodes and a separator is disadvantageous in producing a battery having high energy density, because the ratio of volume and weight of the non-electricity generating part armor case to the entire battery portion becomes large. Also, though a method in which a positive electrode and a negative electrode are closely adhered to a separator via an adhesive resin has been proposed, it causes a problem in that ionic conduction resistance inside the battery cell increases and the battery characteristics are reduced due to large resistance of the adhesive resin layer, when a solid electrolyte layer (corresponds to the separator) is closely adhered to the positive and negative electrodes simply via the adhesive resin.

In addition, in the case of the battery of JP-A-5-159802, positive and negative electrodes are bonded to a solid electrolytic layer with a binder, but since the interfaces of the positive and negative electrodes and the solid electrolyte layer are covered with the binder, it is disadvantageous in terms of ion conductivity when compared for example with a case in which liquid electrolytes are used. Even if a binder having ion conductivity is used, a material having an ion conductivity equal to or larger than that of liquid electrolytes is not generally known, so that it causes a problem in that battery performance similar to that of a battery in which liquid electrolytes are used cannot be obtained easily.

SUMMARY OF THE INVENTION

The present invention has been accomplished as a result of intensive studies on the suitable bonding method of a separator and positive and negative electrodes, conducted by the present inventors with the aim of resolving the aforementioned problems, and it contemplates providing a lithium ion secondary battery having excellent charge and discharge characteristics, which can bond the positive and negative electrodes to the separator without increasing ionic conduction resistance between the positive and negative electrodes and without using a strong armor case, so that it has high energy density and can be made into a thin and optional shape.

A first aspect of the lithium ion secondary battery of the present invention is a lithium ion secondary battery which comprises: a positive electrode active material layer bonded to a positive electrode collector; a negative electrode active material layer bonded to a negative electrode collector; a separator which has surfaces facing respective surfaces of said active material layers; and a lithium ion-containing electrolytic solution kept within said separator, said active material layers and therebetween, wherein convex and concave parts are formed on at least one of the facing surfaces of said positive active material layer and said separator, and at least one of the facing surfaces of said negative material layer and said separator, and two pairs of said facing surfaces are bonded by an adhesive resin layer respectively, so that voids having a predetermined depth are formed by a bonded surface of said convex parts and said concave parts, and the lithium ion-containing electrolytic solution are kept in the voids.

A second aspect of the lithium ion secondary battery of the present invention is the battery according to the first aspect wherein the depth of voids is 30 $\mu$m or less.

A third aspect of the lithium ion secondary battery of the present invention is the battery according to the second aspect wherein the depth of voids is 10 $\mu$m or less.

A forth aspect of the lithium ion secondary battery of the present invention is the battery according to the first aspect wherein the area of bonded surface between respective surfaces is 10 to 30% of the total area of respective facing surfaces.

A fifth aspect of the lithium ion secondary battery of the present invention is the battery according to the first aspect wherein bonding strength of each of positive and negative electrode active material layers with the separator is equal to or larger than respective bonding strength of each of the positive and negative electrode active material layers with each of the positive electrode collector and the negative electrode collector.

A sixth aspect of the lithium ion secondary battery of the present invention is the battery according to the first aspect wherein the adhesive resin layer is porous.

A seventh aspect of the lithium ion secondary battery of the present invention is the battery according to the first aspect wherein the adhesive resin layer is adhered between each of the positive and negative electrode active material layers and the separator partially.

An eighth aspect of the lithium ion secondary battery of the present invention is the battery according to the first aspect wherein the convex and concave parts are formed on the surface of the positive and negative electrode active material layers.

A ninth aspect of the lithium ion secondary battery of the present invention is the battery according to the seventh aspect wherein the adhesive resin layer is adhered only on the convex parts of the positive and negative electrode active material layers.

A tenth aspect of the lithium ion secondary battery of the present invention is the battery according to the first aspect wherein the convex and concave parts are formed on the surface of the separator.

An eleventh aspect of the lithium ion secondary battery of the present invention is the battery according to the seventh aspect wherein the adhesive resin layer is adhered selectively only on the bonded surface of said convex parts.

A twelfth aspect of the lithium ion secondary battery of the present invention is the battery according to the first aspect wherein the convex and concave parts are formed on both surfaces of separator and the active material layers facing the separator regularly so that the convex parts on the separator and those on the active material layers are bonded each other through the adhesive resin layer.

A thirteenth aspect of the lithium ion secondary battery of the present invention is the battery according to the first aspect wherein bonded regions of the separator with each of the active material layers are matched each other on both sides of the separator.

A fourteenth aspect of the method of the present invention of fabricating a lithium ion secondary battery comprises steps of: adhering a positive electrode active material layer to a positive electrode collector; adhering a negative electrode active material layer to a negative electrode collector; forming convex parts and concave parts on at least one of a surface of the positive electrode active material layer and a surface of the separator facing to the positive electrode active material layer, and on at lest one of a surface of the negative electrode active material layer and a surface of the separator facing to the negative electrode active material layer; adhering the adhesive resin layer to at least one of the surface of the positive electrode active material layer and the facing surface of the separator and to at least one of the surface of the negative electrode active material layer and the facing surface of the separator; fitting one surface of the positive electrode active material layer and one surface of the negative electrode active material layer upon respective surfaces of said separator to form voids having a predetermined depth by a bonded surface of said convex parts and concave parts to form a laminated body; and supplying a lithium ion-containing electrolytic solution into said separator, said active material layers and therebetween including the voids.

A fifteenth aspect of the method of the present invention of fabricating a lithium ion secondary battery is the method according to the fourteenth aspect wherein the step of fitting comprises a step of heating a laminated body while pressing.

A sixteenth aspect of the method of the present invention of fabricating a lithium ion secondary battery is the method according to the fourteenth aspect wherein the step of supplying comprises a step of dipping the laminated body into the lithium ion-containing electrolytic solution and a step of injecting them while reducing pressure of the lithium ion-containing electrolytic solution.

A seventeenth aspect of the method of the present invention of fabricating a lithium ion secondary battery is the method according to the fourteenth aspect wherein the step of supplying further comprises a step of drying the laminated body while heating.

A heighteenth aspect of the method of the present invention of fabricating a lithium ion secondary battery is the method according to the fourteenth aspect wherein the step of supplying comprises steps of: covering the laminated body with a flexible package; fitting air-tightly outsides of the laminated body to the flexible package by exhausting the flexible package; injecting the lithium ion-containing electrolytic solution from an opening of the flexible package into said separator, said active material layers and said therebetween including the voids in the laminated body; and sealing the opening of the flexible package.

A nineteenth aspect of the method of the present invention of fabricating a lithium ion secondary battery is the method according to the eighteenth aspect wherein the flexible package is made of resin laminated aluminum and the step of sealing comprises a step of heat-pressing.

A twentieth aspect of the method of the present invention of fabricating a lithium ion secondary battery is the method according to the fourteenth aspect wherein the step of adhering comprises a step of adhering the adhesive resin layer only on the convex parts of the positive and negative electrode active material layers locally so that the adhesive resin layer is adhered selectively only on the bonded surface of said convex parts.

In these drawings, 3 is a positive electrode, 4 is a separator, 5 is a negative electrode, 6 is a positive electrode collector, 7 is a positive electrode active material layer, 9 is a negative electrode active material layer, 10 is a negative electrode collector, 11 is an adhesive resin layer, 11a is a bonded surface, 12 is void and L is depth of void.

DETAILED DESCRIPTION OF THE PREFERRED EMBODIMENT

The mode of carrying out the present invention is described based on FIG. 1 to FIG. 5.

Figure 1:
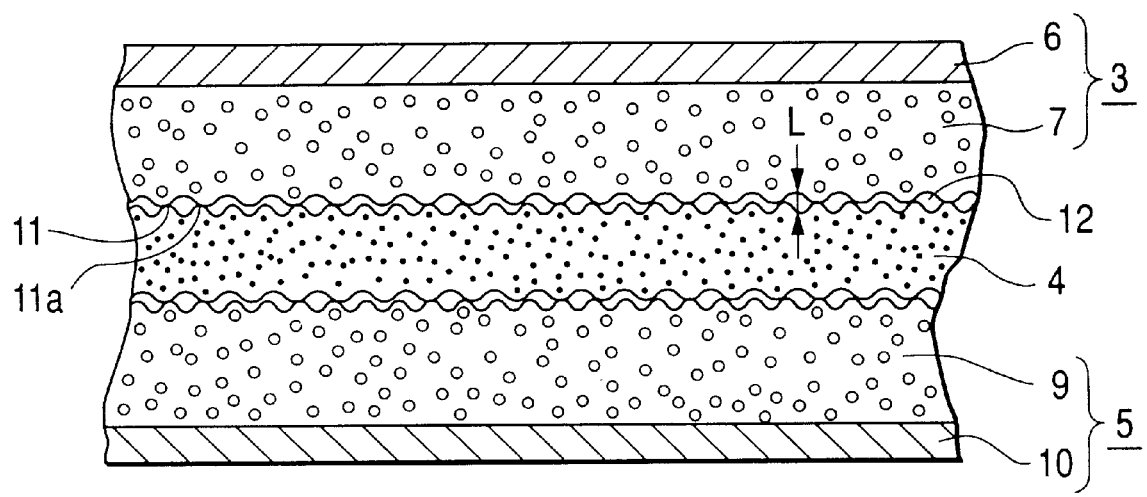
FIG. 1 is a sectional view of the principal part showing a practical mode of the lithium ion secondary battery of the present invention.

FIG. 1 is a sectional view of the principal part showing a practical mode of the lithium ion secondary battery of the present invention, in which 3 is a positive electrode prepared by bonding a positive electrode active material layer 7 to a positive electrode collector 6, 5 is a negative electrode prepared by bonding a negative electrode active material layer 9 to a negative electrode collector 10 and 4 is a separator which is arranged between the positive electrode 3 and negative electrode 5 and keeps a lithium ion-containing electrolytic solution, wherein convex parts and concave parts are formed on the surfaces of the separator 4 facing the active material layers 7, 9 and on the surfaces of the positive electrode active material layer 7 and negative electrode active material layer 9 adjacent (facing) to the facing surfaces of the separator 4. The part 11 is an adhesive resin layer which bonds the facing surfaces of separator 4 to the adjacent surfaces of active material layers 7, 9, thereby bonding these three members through its adhesion to the convex parts. In addition, 12 is voids having a predetermined depth L, which are formed between the electrodes (namely active material layers 7, 9) and the separator 4 by a bonded surface 11a of the convex parts and the concave parts, and a lithium ion-containing electrolytic solution is kept in the voids 12.

In this mode of practice, convex and concave parts are formed on surfaces of the positive and negative electrode active material layers 7, 9 and the separator which becomes a electrolyte layer, and adhesiveness between the electrodes and separator is ensured by the convex parts of bonded surface 11a via the adhesive resin layer 11, so that it becomes possible to prevent peeling between the electrodes and separator, which was difficult to achieve in the conventional batteries. Simultaneously with the bonding and close adhesion of the active material layers 7, 9 to the separator 4 with an adhesive resin, an electrolytic solution can be kept in the voids 12 which have a predetermined depth and are formed between them by the bonded surface 11a of the convex parts and the concave parts, so that excellent ion conductivity of the electrode-electrolyte interface can be ensured and ionic conduction resistance can be reduced. Coming and going quantity of ions in the active material layers inside the electrodes (positive and negative) and drift speed and drift quantity of ions into facing electrodes can be controlled to the same levels of the prior art lithium ion batteries which use armor cases. Electric connection between the active material layers 7, 9 and the separator 4 can be maintained without applying external force. In consequence, a strong armor case is not required for keeping the battery structure, so that lightening and thinning of the battery can be made, optional shapes can be formed and excellent charge and discharge characteristics and battery performance can be obtained which are similar to those of the conventional batteries that use an electrolytic solution.

Also, the depth L of the voids 12 which are formed between the active material layers 7, 9 and the separator 4 by the bonded surface 11a of the convex parts and the concave parts varies depending on the conductivity of the electrolytic solution, but in the case of about $10^{-2}$ S/cm which is usually used, it is desirable to adjust the depth to 30 $\mu$m or less because, if the depth is 30 $\mu$m or less, ionic conduction resistance between the active material layers 7, 9 and the separator 4 becomes sufficiently small which renders possible the use of the battery at a high load factor that does not fall behind those of the liquid electrolyte type batteries. Also, it is more desirable to adjust the depth L of the voids 12 to 10 $\mu$m or less, because dispersion of reaction species progresses more smoothly by adjusting the depth to 10 $\mu$m or less so that the ionic conduction resistance can be reduced more effectively. It is most desirable to adjust the depth L of the voids 12 to a few $\mu$m or less, because it is said that an adhesive layer (diffusion layer) of a few $\mu$m exists on the surface of the active material layers 7, 9 where the electrode reaction occurs, even when the solution is stirred, so that diffusion of reaction species seems to progress most smoothly when the depth L of the voids 12 is adjusted to this level or less.

Also, it is desirable that the area of the bonded surface 11a is 30% or less of the total area of respective facing surfaces of the active material layers 7, 9 and the separator 4, because, by adjusting the area to 30% or less, increase in the ion conductivity resistance between the active material layers 7, 9 and the separator 4 can be prevented so that the battery can be used at a large load factor which does not fall behind the prior art liquid electrolyte type batteries. However, bonding strength of the separator 4 with the positive and negative electrode active material layers 7, 9 becomes weak when the area of bonded surface 11a is adjusted to less than 10%, so that it is desirable that the area of bonded surface 11a between respective surfaces is adjusted to 10 to 30%, most preferably about 20%, of the total area of respective facing surfaces.

Also, when bonding strength between the positive and negative electrode active material layers 7, 9 and the separator 4 is sufficiently large, destruction of the positive and negative electrodes (peeling of the active material layers from the collectors) occurs taking preference over peeling between the positive and negative electrode active material layers 7, 9 and the separator 4, so that it is desirable that bonding strengths between the separator 4 and the positive and negative electrode active material layers 7, 9 are equal to or larger than respective bonding strengths between the positive electrode collector 6 and the positive electrode active material layer 7 and the negative electrode collector 10 and the negative electrode active material layer 9.

Also, when the adhesive resin layer 11 is porous, ionic conduction resistance in the adhesive resin layer and bonded parts can be reduced and resistance between the electrodes can be reduced. In addition, even if the adhesive resin layer 11 is adhered to all of the bonded surface 11a, both surfaces (facing surfaces) of the separator 4 or surfaces of the active material layers 7, 9 adjacent to the facing surfaces, ion conductivity can be ensured via minute pores of the adhesive resin layer 11, so that coating of the adhesive resin layer 11 becomes easy.

In addition, the ionic conduction resistance can further be reduced by forming voids to which the adhesive resin layer 11 is not adhered.

Finally, the lithium ion secondary battery constructed in the aforementioned manner is produced by carrying out a step in which convex parts and concave parts are formed on at least two surfaces among one surface of the positive electrode active material layer 7, one surface of the negative electrode active material layer 9 and two facing surfaces of the separator 4, a step in which a resin layer is adhered to at least two surfaces among one surface of the positive electrode active material layer 7, one surface of the negative electrode active material layer 9 and two facing surfaces of the separator 4, and a step in which one surface of the positive electrode active material layer 7 and one surface of the negative electrode active material layer 9 are put upon respective surfaces of the separator 4 and adhered each other to form voids having a predetermined depth by the bonded surface 11a of the convex parts and the concave parts.

In this case, it is desirable to form the voids 12 to which the adhesive resin layer 11 is not adhered, by locally adhering the adhesive resin layer to portions corresponding to the convex parts.

In this connection, the following methods can be exemplified as the means for locally adhering the adhesive resin layer 11 and the method for coating the adhesive resin on both sides of the separator 4 within a short period of time and in a large amount.

Figure 2A:
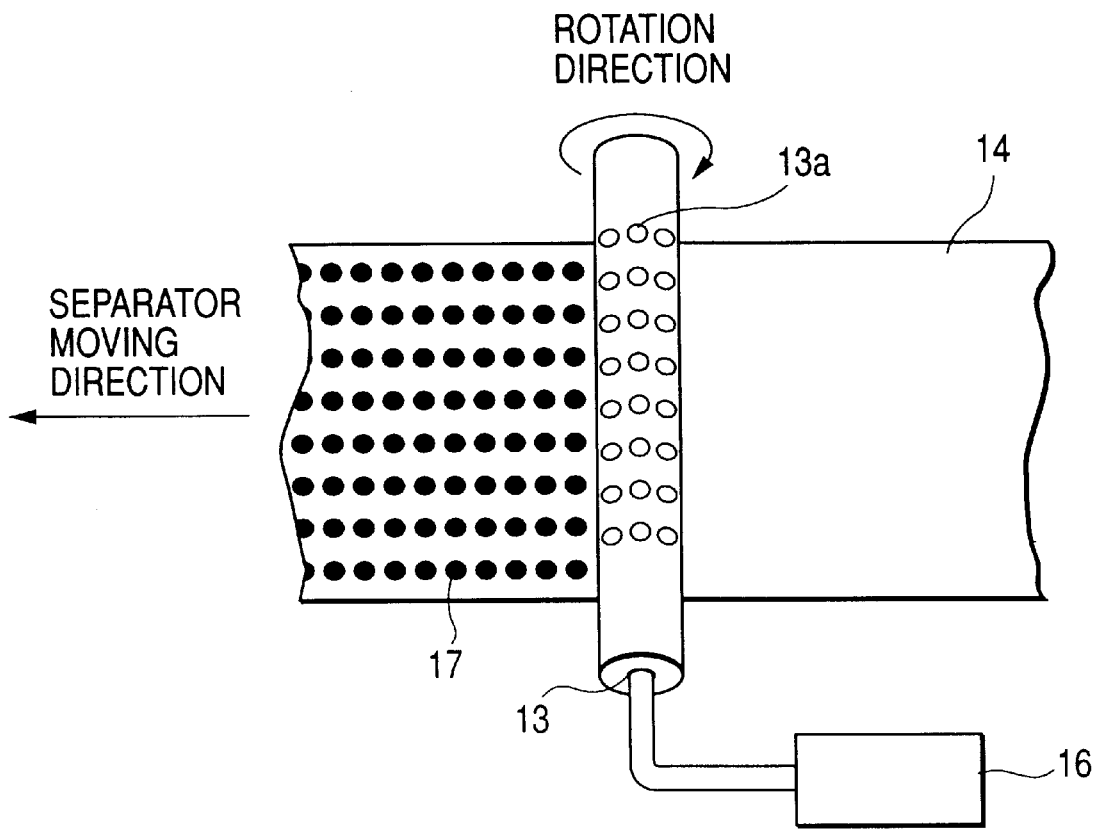
FIG. 2 is an explanation drawing showing a method for coating an adhesive resin solution using a roller having minute openings, according to a practical mode of the present invention.
Figure 2B:
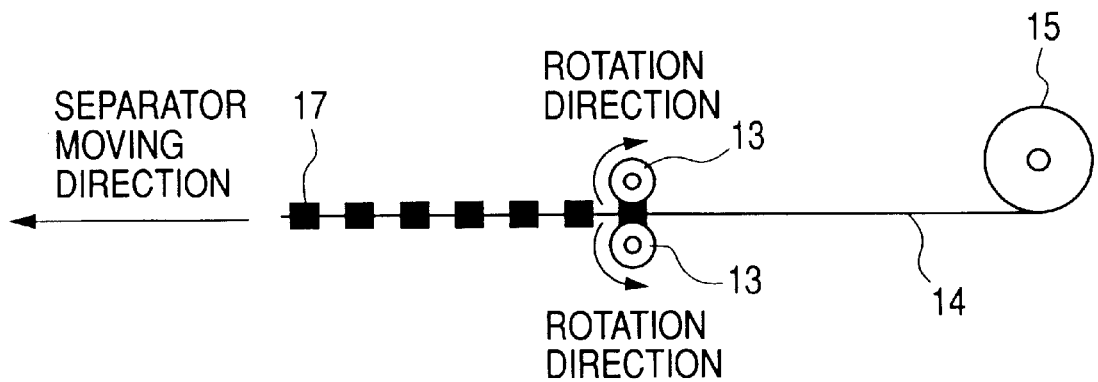

FIGS. 2A and B are an explanation drawing showing a method for coating an adhesive resin using a spin roller having minute pores on its surface, in which FIG. 2A is a plan view and FIG. 2B is a side view. An adhesive resin is filled within the spin roller 13 having minute pores 13a on its surface and the adhesive resin is extruded through the minute pores 13a by applying a pressure to the inner portion of the spin roller 13 using a pressurizer 16. At the same time, the entire spin roller 13 is rotated while moving a separator material 14 supplied from a separator roller 15, thereby coating the adhesive resin 17 in dots on both sides of the separator material 14.

Figure 3:
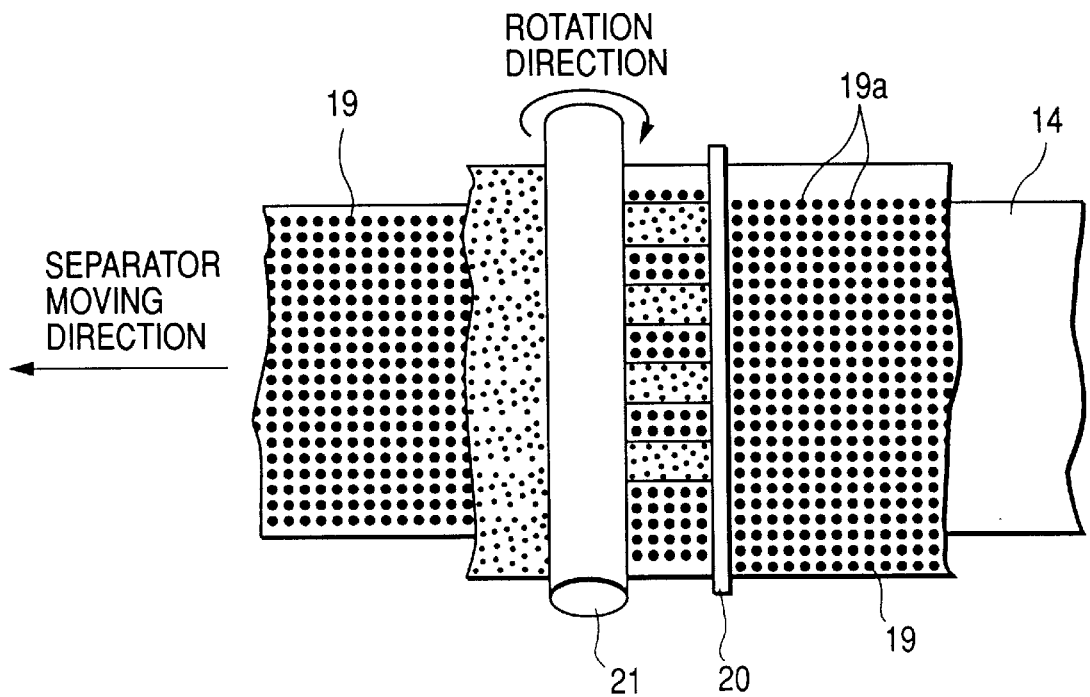
FIG. 3 is an explanation drawing showing a method for coating an adhesive resin solution by screen printing as a practical mode of the present invention.

Also, as shown in FIG. 3, there is a method for the coating of an adhesive resin in which a screen through which openings are bored in dots or lines and a spin roller are used. A caterpillar-like screen 19 through which openings 19a are bored in dots is arranged close to the surface of a separator material 14, an adhesive resin 17 is dropped from an adhesive resin dropping outlet 20 on the screen 19 arranged on the moving separator material 14 and then the thus supplied adhesive resin is rolled using a spin roller 21, thereby transferring a pattern of the adhesive resin 17, which reflects the shape of the openings 19a of the screen 19, onto the separator material 14. By arranging at least two sets of these means on both sides of the separator material 14, the adhesive resin can be coated in dots on both sides of the separator material 14.

Figure 4:
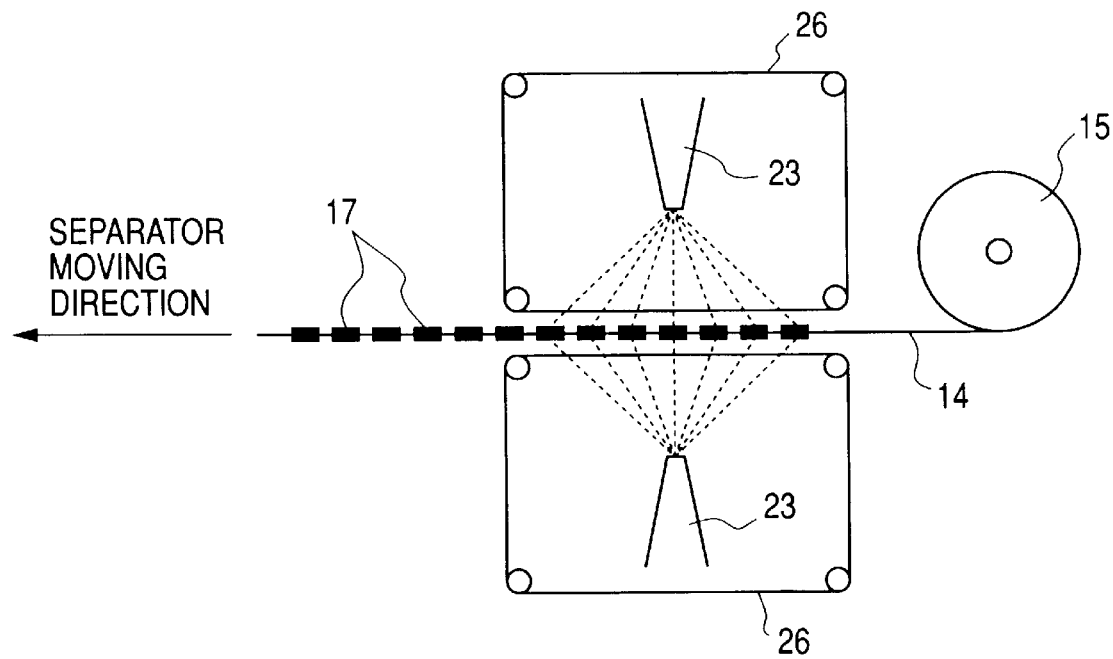
FIG. 4 is an explanation drawing showing a method for coating an adhesive resin solution using a spray gun and a screen, as a practical mode of the present invention.

Also, FIG. 4 is an explanation drawing showing a method for coating an adhesive resin using a spray gun. A caterpillar-like screen 26 through which openings are bored in a dot, line or lattice form is arranged close to the surface of a separator material 14, and a liquid adhesive resin or a adhesive resin solution prepared by dissolving an adhesive resin in a solvent is packed in a spray gun 23 and then sprayed on the separator material 14 through the screen 26. By this process, the adhesive resin 17 is adhered to the separator material 14 according to the shape of openings of the screen 26, for example in a dotted pattern. The adhesive resin can be coated in a dotted pattern on both sides of the separator material 14, by arranging at least one spray gun 23 on each side of the separator material 14 and continuously spraying the adhesive resin solution while moving the separator material 14. In this connection, a net or the like may be used instead of the screen 26.

Figure 5A:
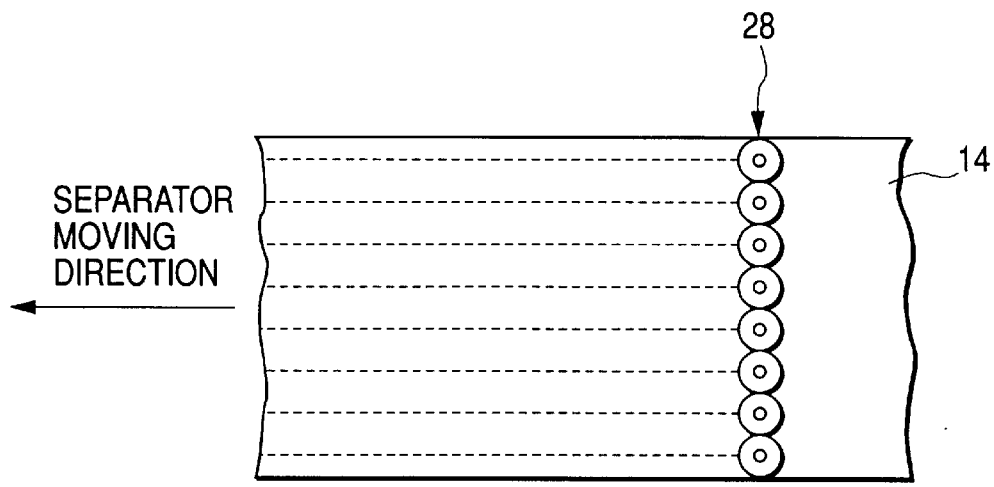
FIG. 5 is an explanation drawing showing a method for coating an adhesive resin solution by a dispenser, as a practical mode of the present invention.
Figure 5B:
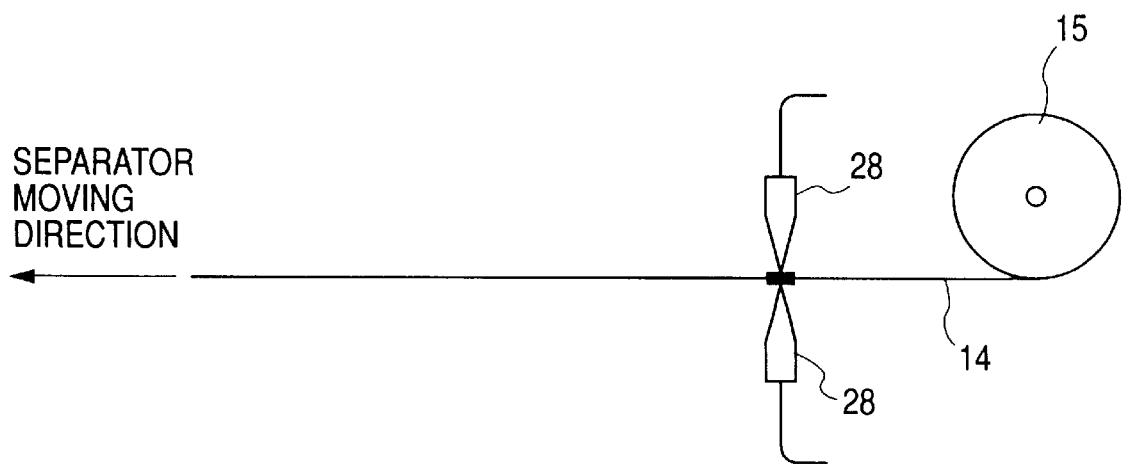

In addition, as shown in the explanation drawing of FIGS. 5A and B, an adhesive resin may be coated in a dotted pattern by arranging at least one or more of a dispenser 28 packed with an adhesive resin solution on a separator material 14 and dropping the adhesive resin solution intermittently in concert with the movement of a separator 27. In this connection, FIG. 5A in the drawing is a plan view and FIG. 5B is a side view.

With regard to the active materials to be used in the present invention, complex oxides of lithium with cobalt, nickel, manganese and the like transition metals, lithium-containing chalcogen compounds or complex compounds thereof, as well as these complex oxides, lithium-containing chalcogen compounds or complex compounds thereof further having additional elements, may be used in the positive electrode, and easy-graphitized carbon, hard-graphitized carbon, polyacene, polyacetylene and the like carbonaceous compounds and pyrene, perylene and the like acene structure-containing aromatic hydrocarbon compounds may be used preferably in the negative electrode. But any other material may also be used with the proviso that it can occlude and release lithium ion which becomes the core of the battery actuation. In addition, these active materials are used in a granular form, and their useful particle size is 0.3 to 20 $\mu$m, most preferably 0.3 to 5 $\mu$m.

As the binder resin which is used for making the active materials into electrode plates, any resin can be used, provided that it is insoluble in the electrolytic solution and does not generate electrochemical reactions in the laminated electrode body. Its illustrative examples include vinylidene fluoride, ethylene fluoride, acrylonitrile, ethylene oxide and the like homopolymers or copolymers thereof and ethylene propylene diamine rubber.

Any metal which is stable in the battery can be used as the collector, but aluminum is preferably used in the positive electrode and copper in the negative electrode. With regard to the shape of the collector, foil, net, expand metal and the like shapes can be employed, but net, expand metal or the like shape having a large void area is desirable in terms of its feasibility to keep the electrolytic solution after bonding.

Also, any material can be used as the separator, with the proviso that it is electron insulating material having sufficient strength, such as a porous membrane, a net, non-woven fabric or the like. Though its construction material is not particularly limited, polyethylene or polypropylene is desirable from the viewpoint of adhesiveness and safety.

With regard to the solvents and electrolyte salts which are used in the electrolytic solution to be used as the ionic conduction body, non-aqueous solvents and lithium-containing electrolyte salts used in conventional batteries can be used. Illustrative examples of the solvent include dimethoxyethane, diethoxyethane, diethyl ether, dimethyl ether and the like ether solvents and propylene carbonate, ethylene carbonate, diethyl carbonate, dimethyl carbonate and the like ester solvents, which may be used as a single solution or as a mixture solution of two of the same or different solvents. Illustrative examples of the electrolyte salt include $LiPF_6$, $LiAsF_6$, $LiClO_4$, $LiBF_4$, $LiCF_3SO_3$, $LiN(CF_3SO_2)_2$, $LiC(CF_3SO_2)_3$, $LiN(C_2F_5SO_2)_2$ and the like.

Also, any resin can be used as the adhesive resin to be used in the adhesion of collectors and electrodes, with the proviso that it is insoluble in the electrolytic solution and does not generate electrochemical reactions in the battery similar to the case of the adhesive resin to be used in the adhesion of electrodes and separator, but a resin which becomes porous membrane is more desirable. Its illustrative examples include vinylidene fluoride, 4-ethylene fluoride and the like polymers which has fluorine atom in its molecular structure, or their mixtures with methyl polymethacrylate, polystyrene, polyethylene, polypropylene and the like.

Examples of the present invention are given below by way of illustration and not by way of limitation.

EMBODIMENT 1

Firstly, preparation of a positive electrode is described.

A positive electrode active material paste prepared by dispersing 87 parts by weight of $LiCoO_2$, 8 parts by weight of graphite powder and 5 parts by weight of polyvinylidene fluoride in N-methylpyrrolidone was coated in a thickness of 300 $\mu$m by the doctor blade method to form an active material thin film. An aluminum net having a thickness of 30 $\mu$m to be used as a positive electrode collector was put on the film, on which was again coated the positive electrode active material paste prepared to a thickness of 300 $\mu$m by the doctor blade method, thereby preparing a laminated body of the positive electrode collector and positive electrode active material paste. The laminate was made into a half-dried state by allowing it to stand for 60 minutes in an oven of 60° C., and then the laminate was rolled to a thickness of 400 $\mu$m using a spin roller whose roll clearance has been adjusted to 400 $\mu$m, thereby preparing a positive electrode having convex and concave parts on the surface of the positive electrode active material layer 7. By sandwiching the aluminum net as the collector instead of planar aluminum foil, convex and concave parts reflecting the shape of the net can be formed on the surface of the positive electrode active material layer 7. In this connection, thickness of the electrode and degree of the irregularity can be adjusted by adjusting roll clearance of the spin roller in the rolling step. Also, the shape of irregularity formed on the surface of the positive electrode active material layer 7 can be changed by changing shapes (mesh size, mesh roughness, opening area rate and the like) of the net to be used as the positive electrode collector.

The thus prepared positive electrode was soaked in an electrolytic solution and then peel strength of the positive electrode active material layer and positive electrode collector was measured. As a measured peel strength, value of 20 to 25 gf/cm is obtained.

Next, preparation of a negative electrode is described.

A negative electrode active material paste prepared by dispersing 95 parts by weight of Meso-Phase-Microbeads Carbon (trade name: manufactured by Osaka Gas) and 5 parts by weight of polyvinylidene fluoride in N-methylpyrrolidone (to be referred to as NMP hereinafter) was coated in a thickness of 300 $\mu$m by the doctor blade method to form an active material thin film. A copper net having a thickness of 20 $\mu$m to be used as a negative electrode collector was put on the film, on which was again coated the negative electrode active material paste prepared to a thickness of 300 $\mu$m by the doctor blade method, thereby preparing a laminated body of the negative electrode collector and negative electrode active material paste. The laminate was made into a half-dried state by allowing it to stand for 60 minutes in an oven of 60° C., and then the laminate was closely adhered by rolling it to a thickness of 400 $\mu$m using a spin roller whose roll clearance has been adjusted to 400 $\mu$m, thereby preparing a negative electrode having convex and concave parts on the surface of the negative electrode active material layer 9. Similar to the case of the positive electrode, convex and concave parts reflecting the shape of the net can be formed on the surface of the negative electrode active material layer 9, by sandwiching the copper net as the collector instead of planar copper foil.

The thus prepared negative electrode was soaked in an electrolytic solution and then peel strength of the negative electrode active material layer and negative electrode collector was measured. As a measured peel strength, a value of 10 to 15 gf/cm is obtained.

The following describes preparation of an electrode laminate in which the aforementioned positive and negative electrodes are bonded to a separator.

Firstly, a viscous adhesive resin solution was prepared by mixing 5 parts by weight of polyvinylidene fluoride and 95 parts by weight of N-methylpyrrolidone (to be referred to as NMP hereinafter) at that compositional ratio and thoroughly stirring the mixture until it became uniform solution.

Next, the thus prepared adhesive resin solution was coated on both sides of a separator material to be used as a separator, namely a rolled-up porous polypropylene sheet (trade name Cell Guard #2400, manufactured by Hoechst) having a width of 12 cm and a thickness of 25 $\mu$m.

As shown in FIGS. 2A and B, coating of the adhesive resin solution was carried out using a spin roller 13 having minute openings 13a. Firstly, a separator material 14 was taken out from a separator roll 15 and sandwiched by the spin roller 13 having minute openings 13a on its surface. The spin roller 13 has such a structure that the aforementioned adhesive resin solution is filled in its inside portion and oozed out through the minute openings 13a on its surface. It was able to coat the adhesive resin 17 in a dotted pattern on both sides of the separator material 14 by applying pressure to the inside of the spin roller 13 having minute openings 13a and simultaneously rotating the roller. Also, it was able to control coating mass of the adhesive resin by changing its discharge from the minute openings 13a through the adjustment of inner pressure of the spin roller 13.

Thereafter, before the resin solution was dried, the positive and negative electrode active material layers 7, 9 were closely adhered and laminated in such a way that they faced each other sandwiching the separator, thereby obtaining an electrode laminate. The thus pasted electrode laminate was allowed to stand for 2 hours in a hot air dryer of 60° C. to effect evaporation of NMP. By the evaporation of NMP, the adhesive resin layer 17 becomes a porous film (adhesive resin layer) which has voids communicating from the separator side into the positive and negative electrode sides. This adhesive resin layer was adjusted to a thickness of about 1 $\mu$m. Subsequently, an electrolytic solution prepared using ethylene carbonate and diethyl carbonate as the solvent and $LiPF_6$ as the solute was injected into the electrode laminate. The injecting step is performed by dipping the electrode laminate in the electrolytic solution kept at a low pressure. When peel strengths of the positive electrode active material and separator and of the negative electrode active material and separator were measured at this stage, the strengths were 25 to 30 gf/cm and 15 to 20 gf/cm, respectively.

Figure 6A:
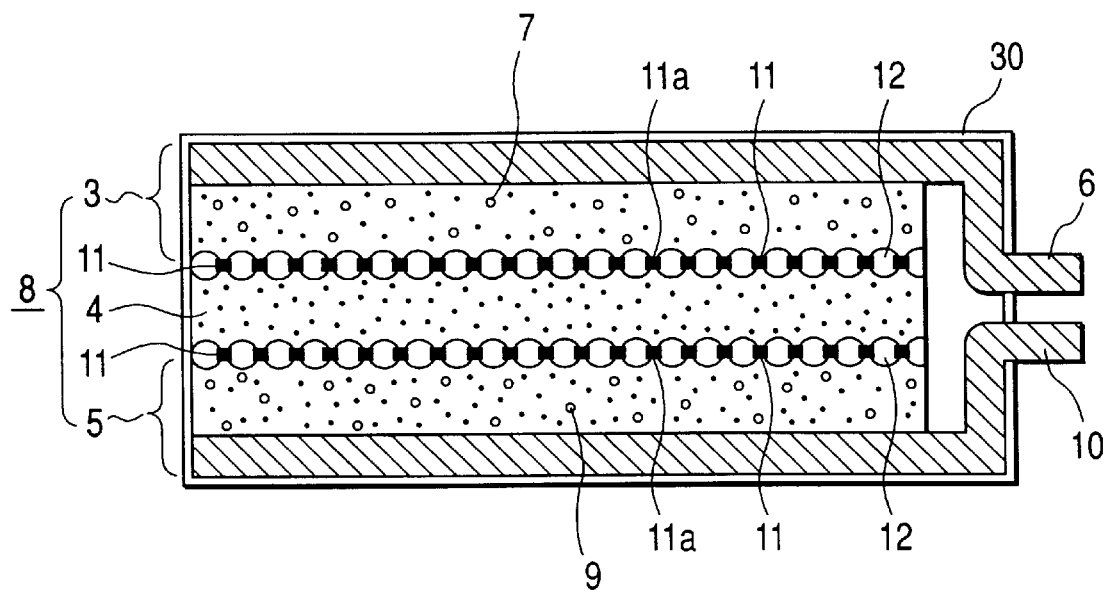
FIGS. 6A and 6B are a sectional illustration showing an example of the lithium ion secondary battery of the present invention and a magnification of magnifying a part of the lithium ion secondary battery.

A lithium ion secondary battery was completed by packing the thus electrolytic solution-injected electrode laminate with a resin laminated aluminum film (to be referred to as an aluminum laminate film hereinafter) and sealing the opening by hot melting. FIG. 6 is a sectional illustration showing an example of the lithium ion secondary battery of this invention. In this drawing, 30 is an armor aluminum laminate pack and 8 is the electrode laminate sealed in the armor aluminum laminate pack. The electrode laminate 8 is composed of a positive electrode 3, a separator 4 and a negative electrode 5. As described in the foregoing, in this lithium ion secondary battery, convex and concave parts are formed on the surfaces of the separator 4 facing both of the active material layers 7, 9 and on the surfaces adjacent to the surfaces of the separator 4 facing the positive electrode active material layer 7 and negative electrode active material layer 9, so that the positive electrode 3, separator 4 and negative electrode 5 are closely adhered via the adhesive resin layer 11 which is adhered to the bonded surface 11a of the convex parts, and a lithium ion-containing electrolytic solution is kept in the voids 12 which are formed by the bonded surface 11a of the convex parts and the concave parts (generated in response to the surface irregularity when the electrodes are adhered to the separator). Since the active material layers 7, 9 and the separator 4 are not completely covered with the adhesive resin layer 11 and the electrolytic solution is kept in the voids 12, increase in the internal resistance between the active material layers 7, 9 and the separator 4 is prevented and excellent ionic conductivity is secured, and the bonding strength of the active material layers 7, 9 with the separator 4 is maintained by the bonded surface 11a of the convex parts of the adhesive resin layer 11, thus rendering possible production of a thin and light battery having excellent charge and discharge characteristics, which does not require external pressurization, namely which does not require a strong armor case.

Figure 6B:
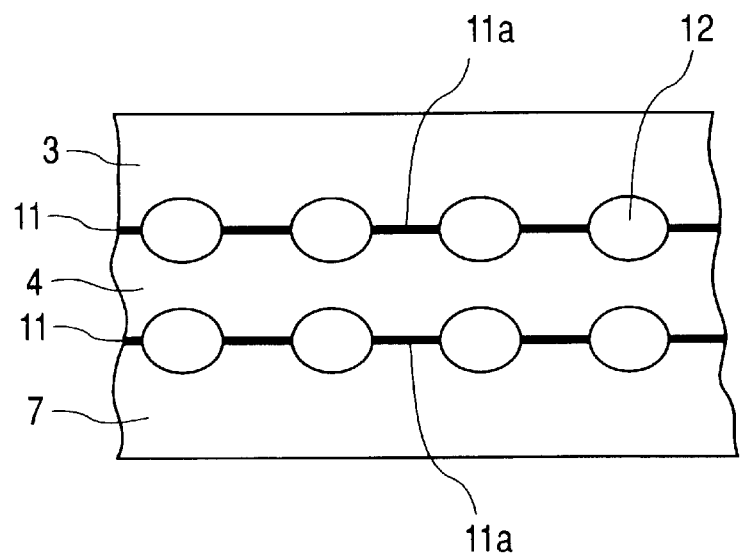

In the embodiment of the present invention, as shown in FIG. 6B, the convex and concave parts are formed on both surfaces of separator 4 and the active material layers 3, 5 facing the separator regularly and the convex parts on the separator and those on the active material layers are bonded to each other through the adhesive resin layer. And bonded regions of the separator with each of the active material layers are matched each other on both sides of the separator 4. According to the structure, in the case that a large force is supplied to the bonded surface, strong bonding strength is kept.

Figure 7:
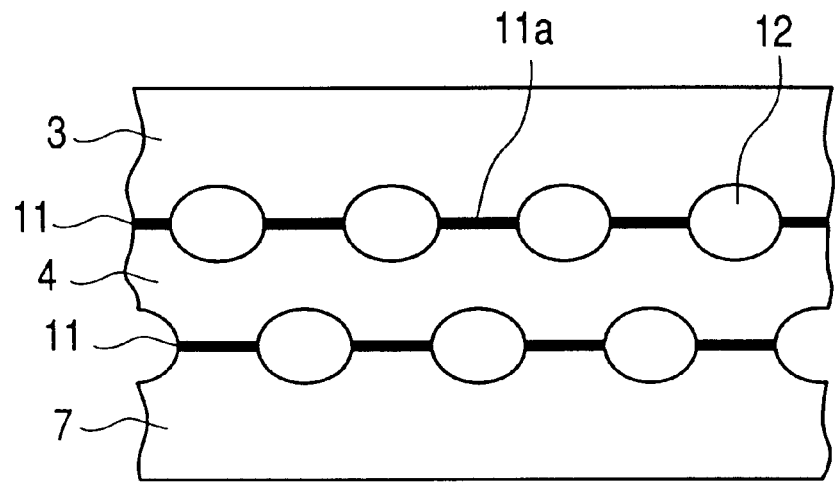
FIGS. 7–10 are sectional illustrations showing another example of the lithium ion secondary battery of the present invention.

On the other hand, as shown in FIG. 7, bonded regions of the separator with each of the active material layers can be formed so as to deviate each other on both sides of the separator 4. However in the case that a large force is supplied to the bonded surface, since bonded regions of the separator with each of the active material layers are deviated each other on both sides of the separator 4, a twisting force is applied to the separator. Therefore, the bond is easily destroyed in comparison with the structure as shown in FIG. 6B.

Figure 8:
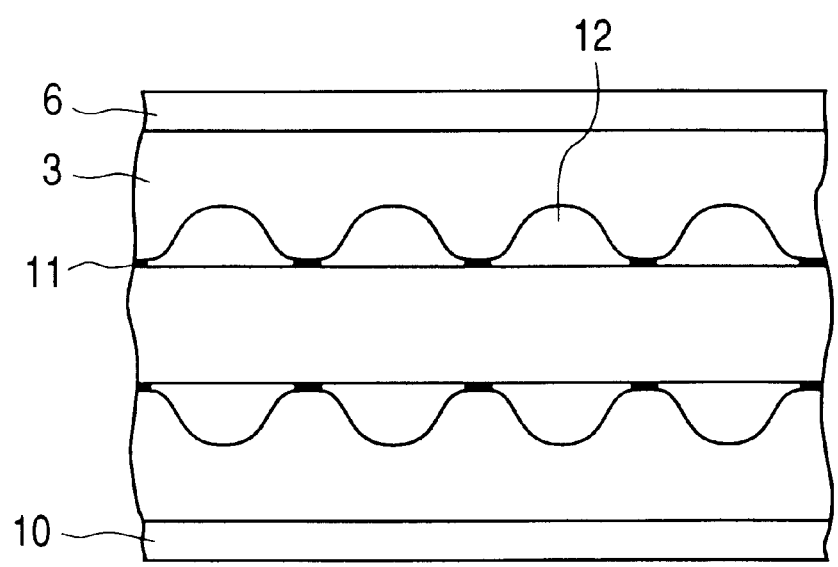
Figure 9:
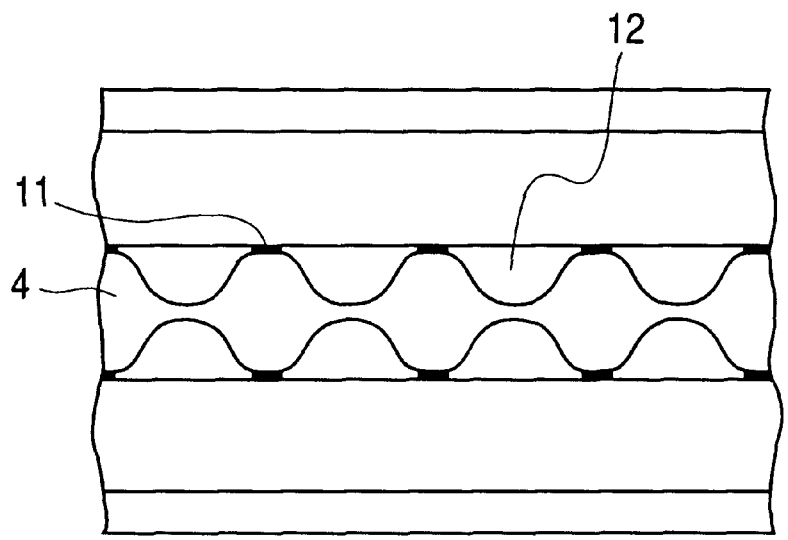

In the first embodiment, convex parts and concave parts are formed on both surfaces of the separator and the active material layers. However as shown in FIG. 8, convex parts and concave parts can be formed only on the surface of the positive and negative active material layers. And as shown in FIG. 9, fluoride resin film whose surfaces are roughened so as to have convex parts and concave parts can be used as a separator, and active material layers having plane surfaces are used as the positive and negative active material layers.

Figure 10:
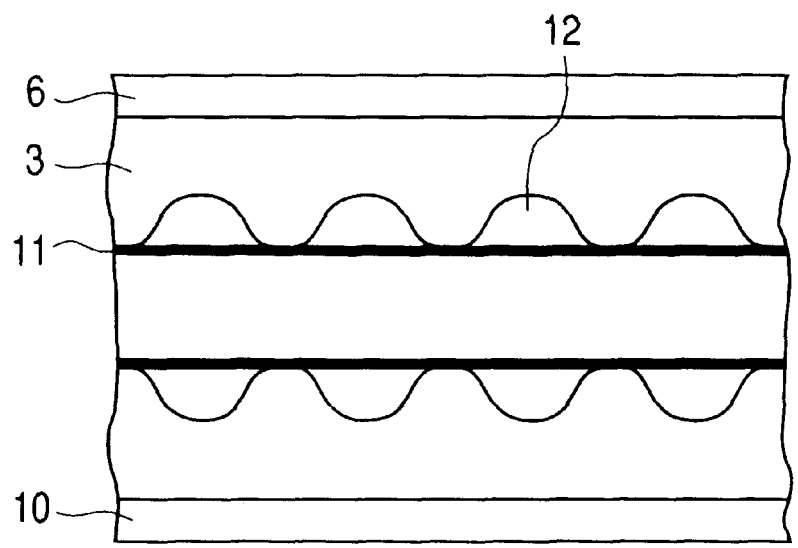
Figure 11:
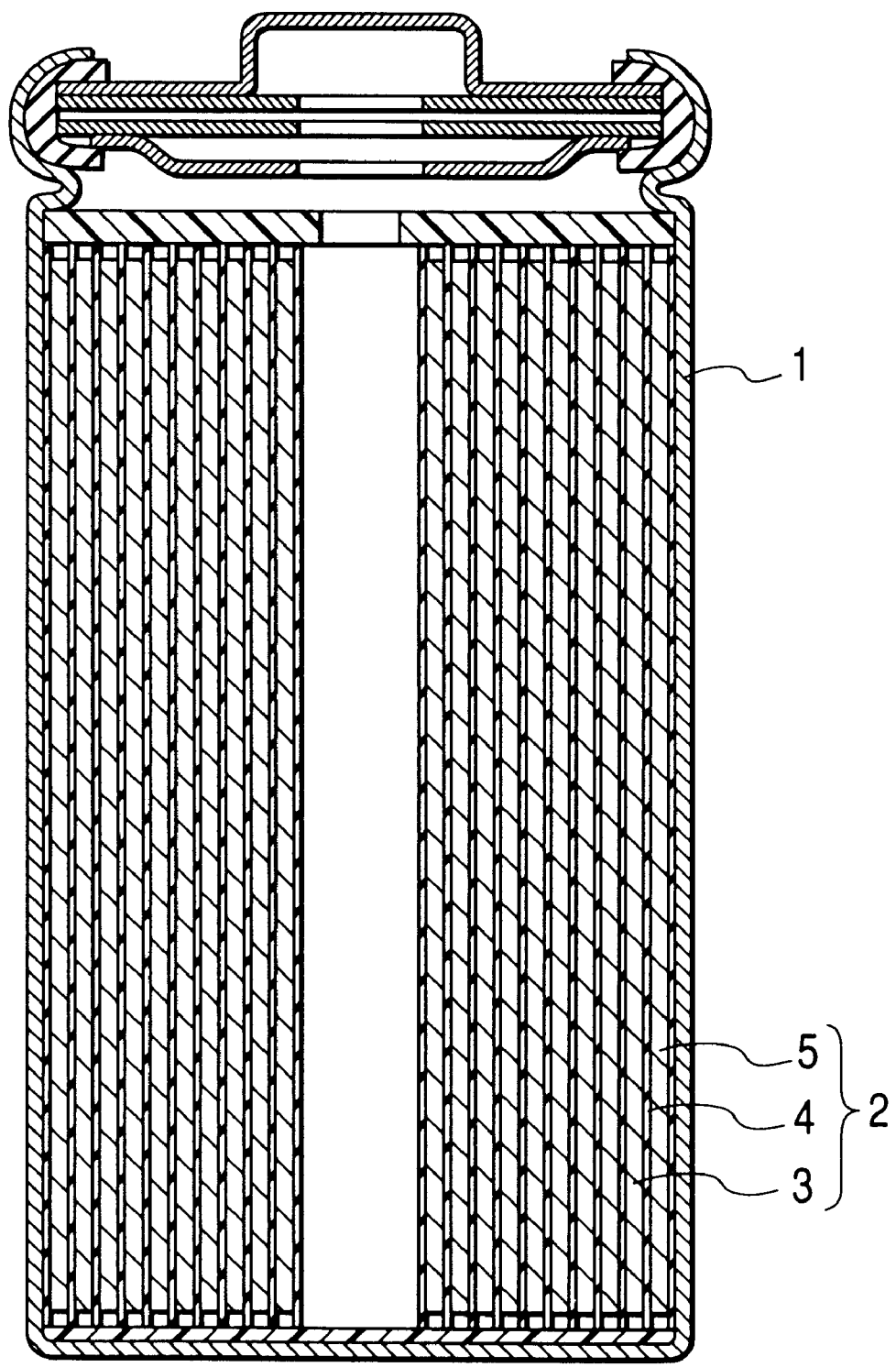
FIG. 11 is a sectional view showing the structure of a prior art lithium ion secondary battery.

In the first embodiment of the present invention, an adhesive resin layer 11 is formed only on a bonded region, however as shown in FIG. 10, an adhesive resin layer 11 is formed on a whole facing surface. In the case that adhesive resin layer is formed only on a bonded region, it is required that positions of convex parts on the positive and negative active material layers are matched to the coating positions of adhesive material layer. However in the case shown in FIG. 10, since an adhesive resin layer 11 is formed on a whole facing surface, it is easy to form an adhesive layer.

In the first embodiment, by dipping the laminated body into the lithium ion-containing electrolytic solution and injecting them while reducing pressure of the lithium ion-containing electrolytic solution, the lithium ion-containing electrolytic solution can be supplied effectively.

Preferably the laminated body is dried by heating, after being supplied.

Further a lithium ion secondary battery can be fabricated by the method as follows. After mounting the laminated body, the laminated body is covered with a flexible package; fitted air-tightly outside of the laminated body to the flexible package by exhausting the flexible package; injected the lithium ion-containing electrolytic solution from an opening of the flexible package into said separator, said active material layers and said therebetween including the voids in the laminated body; and sealing the opening of the flexible package.

According to the method, when the lithium ion-containing electrolytic solution is injected, the back side of the negative and positive electrode collector is covered with the flexible package to be airtight. Therefore the lithium ion-containing electrolytic solution is prevented from reaching the back of the negative and positive electrode collector and solution unnecessary for electrolytic operation is not injected. So total weight of the lithium ion secondary battery can be reduced.

EMBODIMENT 2

As the adhesive resin layer 11 shown in Embodiment 1, viscous adhesive resin solutions were used which have been prepared by mixing N-methylpyrrolidone with each of the following compounds 1–9 instead of polyvinylidene fluoride at the same compositional ratio as Embodiment 1 respectively.

1. Polytetrafluoroethylene
2. Copolymer of vinylidene fluoride and acrylonitrile
3. Mixture of polyvinylidene fluoride and polyacrylonitrile
4. Mixture of polyvinylidene fluoride and polyethylene oxide
5. Mixture of polyvinylidene fluoride and polyethylene terephthalate
6. Mixture of polyvinylidene fluoride and polymethylmethacrylate
7. Mixture of polyvinylidene fluoride and polystyrene
8. Mixture of polyvinylidene fluoride and polypropylene
9. Mixture of polyvinylidene fluoride and polyethylene Using these adhesive resin solutions, the electrode laminate 8 was prepared by the same method of Embodiment 1 respectively. When peel strengths of the positive electrode active material layer 7 and separator 4 and of the negative electrode active material layer 9 and separator 4 in this electrode laminate 8 were measured, the strengths were converged at 15 to 70 gf/cm and 10 to 70 gf/cm, respectively. Thereafter, lithium ion batteries were prepared by injecting an electrolytic solution, packing with an aluminum laminate film and sealing the opening in the same manner as described in Embodiment 1. Similar to the case of Embodiment 1, thin and light batteries having excellent charge and discharge characteristics were obtained.

EMBODIMENT 3

A positive electrode active material paste was coated in a thickness of 300 $\mu$m by the doctor blade method on an aluminum net having a thickness of 30 $\mu$m and an opening area rate of 70%, allowed to stand for 60 minutes in a dryer of 60° C. and then again pressed to a thickness of 250 $\mu$m, thereby obtaining the positive electrode 3. By this method, the difference between convex parts and concave parts of the irregularity formed on the bonded surface of the positive electrode active material layer 7 side (the surface adjacent to separator 4) of the positive electrode 3 of Embodiment 1, namely the depth L of the voids formed between the bonded surface 11a of the convex parts and the concave parts, became 10 $\mu$m or less. Separately from this, the negative electrode 5 was prepared in the same manner using a copper net, an adhesive resin was partially coated in a dotted pattern by the same method described in Embodiment 1 and then the positive electrode 3, the separator 4 and the negative electrode 5 were closely adhered to one another to prepare an electrode laminate. Since the void depth L of the electrode laminate 8 of this example was adjusted to 10 $\mu$m or less, dispersion of the reaction species progresses easily and the ionic conduction resistance of the interfaces between the active material layers 7, 9 and the separator can be reduced, so that the lithium ion secondary battery produced using this laminate can be used at a large load factor which does not fall behind those of the conventional liquid electrolyte type batteries. The depth L of the voids 12 can be controlled for example by the rolling pressure at the time of the formation of the positive and negative electrodes or the mesh size of the net.

EMBODIMENT 4

A positive electrode active material paste was coated in a thickness of 300 $\mu$m by the doctor blade method on an aluminum net having a thickness of 30 $\mu$m and an opening area rate of 80%, allowed to stand for 60 minutes in a dryer of 60° C. and then again pressed to a thickness of 200 $\mu$m, thereby obtaining the positive electrode 3 in which convex parts and concave parts were formed on the surface of the active material layer 7. Separately from this, the negative electrode 5 was prepared in the same manner using a copper net. Convex parts and concave parts were also formed on the surface of the negative electrode active material layer 9. Next, an adhesive resin was coated by the same method described in Embodiment 1 and then the positive electrode 3, the separator 4 and the negative electrode 5 were closely adhered to one another to prepare the electrode laminate 8. In this method, area of the bonded surface 11a was adjusted to 20% of the total area of each of the active material layers 7, 9. Since the coated portion of the adhesive resin layer was 20%, increase in the ionic conduction resistance between the active material layers 7, 9 was able to be prevented, so that the battery was able to be used at a large load factor which did not fall behind those of the conventional liquid electrolyte type batteries. In this connection, the area of the bonded surface 11a can be adjusted based on the surface shapes of the active material layers 7, 9 and the separator 4, which are controlled by mesh size, opening area rate and the like of the net, and coating (adhering) conditions of the adhesive resin.

EMBODIMENT 5

A positive electrode active material paste was coated in a thickness of 300 $\mu$m by the doctor blade method on an aluminum net having a thickness of 30 $\mu$m and an opening area rate of 80%, allowed to stand for 60 minutes in a dryer of 60° C. and then again pressed to a thickness of 250 $\mu$m, thereby obtaining the positive electrode 3 in which convex parts and concave parts were formed on the surface of the active material layer 7. Separately from this, the negative electrode 5 was prepared in the same manner using a panting metal made of copper, in which convex parts and concave parts were formed on the surface of the active material layer 9. Next, an adhesive resin was coated by the same method described in Embodiment 1 and then the positive electrode 3, the separator 4 and the negative electrode 5 were closely adhered to one another to prepare the electrode laminate 8. In this case, the depth L of the voids 12 formed between the active material layers 7, 9 and the separator 4 by the bonded surface 11a of the convex parts and the concave parts was adjusted to 10 $\mu$m or less. The void depth L can be controlled for example by the rolling pressure at the time of the electrode formation or the opening area rate, opening shape and the like of the panting metal. By the adjustment of the void depth to 10 $\mu$m or less, dispersion of the reaction species progresses easily so that the ionic conduction resistance between the active material layers 7, 9 and the separator 4 can be reduced and the battery can therefore be used at a large load factor which does not fall behind those of the conventional liquid electrolyte type batteries.

EMBODIMENT 6

A positive electrode active material paste was coated in a thickness of 300 $\mu$m by the doctor blade method on an aluminum panting metal collector material having a thickness of 30 $\mu$m and an opening area rate of 80%, allowed to stand for 60 minutes in a dryer of 60° C. and then again pressed to a thickness of 200 $\mu$m, thereby obtaining the positive electrode 3 in which convex parts and concave parts were formed on the surface of the active material layer 7. Separately from this, the negative electrode 5 was prepared in the same manner using a copper panting metal in which convex parts and concave parts were also formed on the surface of the negative electrode active material layer 9. Next, an adhesive resin was coated by the same method described in Embodiment 1 and then the positive electrode 3, the separator 4 and the negative electrode 5 were closely adhered to one another to prepare the electrode laminate 8. Since the area of the bonded surface 11a between the active material layers 7, 9 and the separator was adjusted to 20% of the total area of each of the active material layers 7, 9 in this method, increase in the ionic conduction resistance between the active material layers 7, 9 and the separator was able to be prevented, or the resistance was able to be reduced in other words, so that the battery was able to be used at a large load factor which did not fall behind those of the conventional liquid electrolyte type batteries.

EMBODIMENT 7

A positive electrode active material paste was coated in a thickness of 300 $\mu$m by the doctor blade method on an aluminum foil collector material having a thickness of 30 $\mu$m and allowed to stand for 60 minutes in a dryer of 60° C., and an expanded metal having a thickness of 30 $\mu$m and an opening area rate of 20% was pressed on the surface of the active material paste and then the expanded metal was removed from the surface. As a result, an active material layer 7 which has convex and concave parts having a depth of 30 $\mu$m on the surface thereof are formed. And subsequently the thus treated active material layer 7 is pressed to a total thickness of 250 $\mu$m to form the positive electrode 3. Separately from this, the negative electrode 5 was prepared in the same manner using a copper foil collector material. Next, an adhesive resin was coated by the same method described in Embodiment 1 and then the positive electrode 3, the separator 4 and the negative electrode 5 were closely adhered to one another to prepare the electrode laminate 8. In this case, the depth L of the voids 12 formed between the active material layers 7, 9 and the separator 4 by the concave parts on the surface of the active material layers 7, 9 was adjusted to 10 $\mu$m or less. By the adjustment of the void depth to 10 $\mu$m or less, dispersion of the reaction species progresses easily so that increase in the ionic conduction resistance between the active material layers 7, 9 and the separator 4 and the resulting battery can therefore be used at a high load factor which does not fall behind those of the conventional liquid electrolyte type batteries.

EMBODIMENT 8

A positive electrode active material paste was coated in a thickness of 300 $\mu$m by the doctor blade method on an aluminum foil collector material having a thickness of 30 $\mu$m and allowed to stand for 60 minutes in a dryer of 60° C., and an panting metal having a thickness of 30 $\mu$m and an opening area rate of 20% was pressed on the surface of the active material paste and the panting metal was then removed from the surface. As a result, an active material layer 7 which has convex and concave parts having a depth of 30 $\mu$m are formed on the surface thereof. And subsequently the thus treated active material layer 7 are pressed to a total thickness of 250 $\mu$m to form the positive electrode 3. Separately from this, the negative electrode 5 was prepared in the same manner using a copper foil collector material. Next, an adhesive resin was coated by the same method described in Embodiment 1 and then the positive electrode 3, the separator 4 and the negative electrode 5 were closely adhered to one another to prepare the electrode laminate 8. Since the area of the bonded surface 11a between the active material layers 7, 9 and the separator 4 was adjusted to 20% of the total area of the active material layers 7, 9 in this method, increase in the ionic conduction resistance between the active material layers 7, 9 and the separator 4 was able to be prevented so that the battery was able to be used at a high load factor which did not fall behind those of the conventional liquid electrolyte type batteries.

EMBODIMENT 9

As shown in FIG. 3, a rolled-up porous polypropylene sheet (trade name Cell Guard #2400, manufactured by Hoechst) having a width of 12 cm and a thickness of 25 $\mu$m to be used as a separator material 14 was taken out, and a caterpillar-like screen 19 in which openings 19a having a diameter of 100 $\mu$m have been bored in a dotted pattern was pressed on the separator material 14. The adhesive resin solution shown in Embodiment 1 was applied dropwise on the screen 19, and the adhesive resin was rolled on the screen with a coating roller 21, thereby effecting transfer and coating of the adhesive resin solution in a dotted pattern on the separator. Next, the separator material was twisted to an angle of 180 degrees to transfer and coat the adhesive resin on the un-coated side of the separator, which enabled coating of the adhesive resin 17 on both sides of the separator material 14. When the adhesive resin solution shown in Embodiment 2 was used, it was able also to coat the adhesive resin suitably on both sides of the separator material 14 in a dotted pattern. Thus, a lithium ion secondary battery having excellent characteristics similar to the case of Embodiments 1 to 8 was obtained even by the use of a separator material 14 to which an adhesive resin layer was adhered.

EMBODIMENT 10

As shown in FIG. 4, a rolled-up porous polypropylene sheet (trade name Cell Guard #2400, manufactured by Hoechst) having a width of 12 cm and a thickness of 25 $\mu$m to be used as a separator material 14 was taken out, and the separator 14 was sandwiched between two caterpillar-like screens 26 in which openings have been bored in a dotted pattern. Next, using a spray gun filled with the adhesive resin solution shown in Embodiment 1, the adhesive resin solution was sprayed on the separator material 14. By this spraying method, it was able to coat the adhesive resin solution in a dotted pattern on both sides of the separator material 14. Also, it was able to control coating mass of the adhesive resin by changing the spray velocity. When the adhesive resin solution shown in Embodiment 2 was used, it was able also to coat the adhesive resin solution properly on both sides of the separator material 14 in a dotted pattern. Also, a lithium ion secondary battery having excellent characteristics was obtained by the use of a separator to which an adhesive resin layer was adhered.

EMBODIMENT 11

As shown in FIG. 5, a rolled-up porous polypropylene sheet (trade name Cell Guard #2400, manufactured by Hoechst) having a width of 12 cm and a thickness of 25 $\mu$m to be used as a separator material 14 was taken out, and the adhesive resin solution shown in Embodiment 1 was filled in 8 on one side, 16 in total, of dispensers 28 arranged on both sides of the separator material 14. It was able to coat the adhesive resin solution in a dotted pattern, by dropping the thus prepared adhesive resin solution intermittently on the surface of the separator material 14 simultaneously with the movement of the separator material 14. When the adhesive resin solution shown in Embodiment 2 was used, it was able also to coat the adhesive resin solution properly on both sides of the separator material 14. Also, a lithium ion secondary battery having excellent characteristics was obtained by the use of a separator material 14 to which an adhesive resin layer was adhered.

In the first aspect of the lithium ion secondary battery of the present invention, the battery is equipped with a positive electrode active material layer bonded to a positive electrode collector, a negative electrode active material layer bonded to a negative electrode collector and a separator which has surfaces facing respective surfaces of said active material layers and keeps a lithium ion-containing electrolytic solution, in which convex and concave parts formed on said facing surfaces or on the surface of each of said active material layers adjacent to said facing surfaces are bonded by an adhesive resin layer to each of said facing surfaces and the surface of each of said active material layers adjacent to said facing surfaces, thus having voids of a predetermined depth formed by a bonded surface of said convex parts and said concave parts and also having a lithium ion-containing electrolytic solution kept in the voids, so that adhesiveness between the positive and negative electrode active material layers and the separator can be secured by the bonded surface of convex parts and proper ion conductivity between the positive and negative electrode active material layers and the separator can be secured by the electrolytic solution kept in the voids formed by the concave parts, thus exerting an effect of being able to obtain a lithium ion secondary battery which has excellent charge and discharge characteristics, can be made into a thin battery having high energy density and is able to be formed into optional shapes.

In the second aspect of the lithium ion secondary battery of the present invention, the depth of voids according to the first aspect is adjusted to 30 $\mu$m or less, so that dispersion of the reaction species progresses easily and the ionic conduction resistance between the positive and negative electrode active material layers and the separator can therefore be reduced, thus rendering possible its use at a large load factor which does not fall behind the conventional liquid electrolyte type batteries.

In the third aspect of the lithium ion secondary battery of the present invention, the depth of voids is adjusted to 10 $\mu$m or less, so that diffusion of the reaction species progresses more easily, thus rendering possible its use at a higher load factor.

In the forth aspect of the lithium ion secondary battery of the present invention, the area of bonded surface between respective surfaces according to the first aspect is adjusted to 10 to 30% of the total area of respective facing surfaces, so that increase in the ionic conduction resistance between the positive and negative electrode active material layers and the separator can be repressed, thus rendering possible its use at a large load factor which does not fall behind the conventional liquid electrolyte type batteries.

In the fifth aspect of the lithium ion secondary battery of the present invention, bonding strengths between the separator and the positive and negative electrode active material layers according to the first aspect are equal to or larger than respective bonding strengths between the positive electrode collector and the positive electrode active material layer and the negative electrode collector and the negative electrode active material layer, so that destruction of the electrodes (peeling of the active material layers from the collectors) occurs taking preference over peeling between the active material layers and the separator. Also, adhesiveness between the active material layers and the separator can be fully secured and maintained without using a strong armor case.

In the sixth aspect of the lithium ion secondary battery of the present invention, the adhesive resin layer according to the first aspects is in a porous form, so that resistance between the positive and negative electrodes can be kept at a low level.

In the seventh aspect of the lithium ion secondary battery of the present invention, voids to which the adhesive resin layer is not adhered are formed in the first aspect, so that increase in the ionic conduction resistance can further be repressed.

According to the method of the present invention for the production of a lithium ion secondary battery, it comprises a step of forming convex parts and concave parts on at least two surfaces among one surface of the positive electrode active material layer, one surface of the negative electrode active material layer and two facing surfaces of the separator, a step of adhering the adhesive resin layer to at least two surfaces among one surface of the positive electrode active material layer, one surface of the negative electrode active material layer and two facing surfaces of the separator, and a step of putting one surface of the positive electrode active material layer and one surface of the negative electrode active material layer upon respective surfaces of said separator and pressing them to form voids having a predetermined depth by a bonded surface of said convex parts and said concave parts, so that it exerts an effect in obtaining excellent lithium ion secondary batteries simply and easily with good workability.

Also, in carrying out the production method, resistance between the positive and negative electrodes inside the battery can be kept at a low level by locally adhering the adhesive resin layer to effect formation of voids to which the adhesive resin layer is not adhered.

What is claimed is:

1. A lithium ion secondary battery comprising:
   a positive electrode active material layer bonded to a positive electrode collector;
   a negative electrode active material layer bonded to a negative electrode collector;
   a separator which has surfaces facing respective surfaces of said active material layers; and
   a lithium ion-containing electrolytic solution kept within said separator, said active material layers and therebetween,
      wherein convex and concave parts are formed on at least one of the facing surfaces of said positive active material layer and said separator, and at least one of the facing surfaces of said negative material layer and said separator, and two pairs of said facing surfaces are bonded by an adhesive resin layer respectively, so that voids having a predetermined depth are formed by a bonded surface of said convex parts and said concave parts, and the lithium ion-containing electrolytic solution is kept in the voids.

2. The lithium ion secondary battery according to claim 1 wherein the depth of voids is 30 $\mu$m or less.

3. The lithium ion secondary battery according to claim 2 wherein the depth of voids is 10 $\mu$m or less.

4. The lithium ion secondary battery according to claim 1 wherein the area of bonded surface between respective surfaces is 10 to 30% of the total area of respective facing surfaces.

5. The lithium ion secondary battery according to claim 1 wherein bonding strength of each of positive and negative electrode active material layers with the separator is equal to or larger than respective bonding strength of each of the positive and negative electrode active material layers with each of the positive electrode collector and the negative electrode collector.

6. The lithium ion secondary battery according to claim 1 wherein the adhesive resin layer is porous.

7. The lithium ion secondary battery according to claim 1 wherein the adhesive resin layer is adhered between each of the positive and negative electrode active material layers and the separator partially.

8. The lithium ion secondary battery according to claim 1 wherein the convex and concave parts are formed on the surface of the positive and negative electrode active material layers.

9. The lithium ion secondary battery according to claim 8 wherein the adhesive resin layer is adhered only on the convex parts of the positive and negative electrode active material layers.

10. The lithium ion secondary battery according to claim 1 wherein the convex and concave parts are formed on the surface of the separator.

11. The lithium ion secondary battery according to claim 10 wherein the adhesive resin layer is adhered selectively only on the bonded surface of said convex parts.

12. The lithium ion secondary battery according to claim 1 wherein the convex and concave parts are formed on both surfaces of separator and the active material layers facing the separator so that the convex parts on the separator and those on the active material layers are bonded to each other through the adhesive resin layer.

13. The lithium ion secondary battery according to claim 1 wherein bonded regions of the separator with each of the active material layers are matched to each other on both sides of the separator.

14. A method of fabricating a lithium ion secondary battery, comprising steps of:

adhering a positive electrode active material layer to a positive electrode collector;

adhering a negative electrode active material layer to a negative electrode collector;

forming convex parts and concave parts on at least one of a surface of the positive electrode active material layer and a surface of the separator facing to the positive electrode active material layer, and on at least one of a surface of the negative electrode active material layer and a surface of the separator facing to the negative electrode active material layer;

adhering the adhesive resin layer to at least one of the surface of the positive electrode active material layer and the facing surface of the separator and to at least one of the surface of the negative electrode active material layer and the facing surface of the separator;

fitting one surface of the positive electrode active material layer and one surface of the negative electrode active material layer upon respective surfaces of said separator to form voids having a predetermined depth by a bonded surface of said convex parts and concave parts to form a laminated body; and supplying a lithium ion-containing electrolytic solution into said separator, said active material layers and therebetween including the voids.

15. The method of fabricating a lithium ion secondary battery according to claim 14 wherein the step of fitting comprises a step of heating a laminated body while pressing.

16. The method of fabricating a lithium ion secondary battery according to claim 14 wherein the step of supplying comprises a step of dipping the laminated body into the lithium ion-containing electrolytic solution and a step of injecting them while reducing pressure of the lithium ion-containing electrolytic solution.

17. The method of fabricating a lithium ion secondary battery according to claim 14 wherein the step of supplying further comprises a step of drying the laminated body while heating.

18. The method of fabricating a lithium ion secondary battery according to claim 14 wherein the step of supplying comprises steps of:

covering the laminated body with a flexible package;

fitting air-tightly outsides of the laminated body to the flexible package by exhausting the flexible package;

injecting the lithium ion-containing electrolytic solution from an opening of the flexible package into said separator, said active material layers and said therebetween including the voids in the laminated body; and sealing the opening of the flexible package.

19. The method of fabricating a lithium ion secondary battery according to claim 18 wherein the flexible package is made of resin laminated aluminum and the step of sealing comprises a step of heat-pressing.

20. The method of fabricating a lithium ion secondary battery according to claim 14 wherein the step of adhering comprises a step of adhering the adhesive resin layer only on the convex parts of the positive and negative electrode active material layers locally so that the adhesive resin layer is adhered selectively only on the bonded surface of said convex parts.

* * * * *